United States Patent [19]

Zenda et al.

[11] Patent Number: 5,326,632
[45] Date of Patent: Jul. 5, 1994

[54] MOISTURE-PERMEABLE WATERPROOF FABRIC AND PROCESS FOR PRODUCTION THEREOF

[75] Inventors: Tatsuya Zenda; Yutaka Hayashi, both of Ishikawa; Motoaki Kitagawa, Hikone; Takashi Seino, Shiga, all of Japan

[73] Assignees: Komatsu Seiren Co., Ltd.; Toray Industries, Inc., Japan

[21] Appl. No.: 846,521

[22] Filed: Mar. 4, 1992

Related U.S. Application Data

[63] Continuation-in-part of Ser. No. 740,294, Aug. 5, 1991, abandoned.

[30] Foreign Application Priority Data

Aug. 7, 1990 [JP] Japan ................. 2-207564

[51] Int. Cl.$^5$ ................................. B32B 7/00
[52] U.S. Cl. ........................ 428/262; 428/265; 428/290; 427/246; 427/352; 427/373; 427/422
[58] Field of Search ............ 428/265, 262, 290; 427/246, 352, 373, 402

[56] References Cited

U.S. PATENT DOCUMENTS 4,539,255 9/1985 Sato et al. ......................... 428/252
4,560,611 12/1985 Naka et al. ........................ 428/266
4,636,424 1/1987 Anemiya et al. .................. 428/198

FOREIGN PATENT DOCUMENTS 62-077922 4/1937 Japan.
60-162872 8/1985 Japan.
61-194277 8/1986 Japan.
62-097986 5/1987 Japan.
02047058 2/1990 Japan.

Primary Examiner—George F. Lesmes
Assistant Examiner—Chris Raimund
Attorney, Agent, or Firm—Austin R. Miller

[57] ABSTRACT

A moisture-permeable waterproof fabric having a resin layer formed on at least one surface thereof, wherein the resin layer is composed of a mixture comprising a product obtained by reacting a urethane prepolymer having isocyanate terminals with an N-carboxyamino acid anhydride and an amine, and a polyurethane having a 100% modulus of at least 40 kg/cm$^2$, the amount of the resin product contained in the resin layer is 12.9 to 85.3% by weight of total solid resin, and the amount of the urethane/amino acid copolymer contained in the resin layer is 0.9 to 9.0% by weight of total solid resin. The fabric has both an excellent moisture permeability and waterproofness, as well as an excellent abrasion resistance and washing fastness.

13 Claims, No Drawings

MOISTURE-PERMEABLE WATERPROOF FABRIC AND PROCESS FOR PRODUCTION THEREOF

CROSS-REFERENCE TO RELATED APPLICATION

This is a continuation-in-part of application Ser. No. 740,294, filed on Aug. 5, 1991, now abandoned.

BACKGROUND OF THE INVENTION (1) Field of the Invention

The present invention relates to a moisture-permeable waterproof fabric, and a process for the production thereof. More particularly, the present invention relates to a moisture-permeable waterproof fabric having a high moisture permeability and a high waterproofness, and having an excellent abrasion resistance and an excellent washing fastness, and further, to a process for the production of this fabric.

(2) Description of the Related Art

As the conventional process for the production of a processed fabric having a moisture permeability and a waterproofness, for example, a process comprising coating a polyurethane on a fabric and forming cells in the resin layer by wet coagulation is disclosed in Japanese Unexamined Patent Publication No. 58-144178. Furthermore, a process comprising laminating a fabric with a dry-coagulated polyurethane film is disclosed, for example, in Japanese Unexamined Patent Publication No. 58-203172.

Nevertheless, since the moisture permeability and the waterproofness are functions contradictory to each other, according to the above-mentioned conventional techniques using a polyurethane as the material, it is difficult to enhance both properties simultaneously. For example, when the moisture permeability is maintained at 4,000 $g/m^2 \cdot 24$ hours, it is impossible to obtain a processed fabric having a water pressure resistance higher than 2,000 $mmH_2O$.

As the means for overcoming this disadvantage, use of a film formed by wet-coagulating a polyaumino acid-modified urethane is proposed, for example, in Japanese Unexamined Patent Publication No. 60-154054. According to this technique, a processed fabric having a moisture permeability of at least 7,000 $g/m^2 \cdot 24$ hours and a water pressure resistance of a least 1,500 $mmH_2O$ is obtained.

Nevertheless, the technique of using a resin layer composed of a polyamino acid-modified urethane is defective in that the abrasion resistance of the resin layer is poor and the washing fastness is extremely low. Namely, the waterproofness and the peel strength are immediately drastically degraded upon washing, and therefore, the processed fabric cannot be put to practical use.

Furthermore, there is known a technique of using a resin layer composed of a mixture of a polyamino acid-modified urethane and a polyurethane, but this technique is defective in that the abrasion resistance and washing fastness are poor. Namely, the waterproofness and peel strength are degraded, and the practical use of this processed fabric is difficult.

SUMMARY OF THE INVENTION

Therefore, a primary object of the present invention is to provide a moisture-permeable waterproof fabric having both an excellent moisture permeability and waterproofness, and further, an excellent abrasion resistance and washing fastness.

Another object of the present invention is to provide a process for the production of this fabric.

More specifically, in accordance with the present invention, there is provided a moisture-permeable waterproof fabric having a resin layer formed on at least one surface thereof, wherein the resin layer is composed of a mixture comprising a product obtained by reacting a urethane prepolymer having isocyanate terminals with an N-carboxyamino acid anhydride and an amine, and a polyurethane having a 100% modulus of at least 40 $kg/cm^2$, the amount of the resin product contained in the resin layer is 12.9 to 85.3% by weight of total solid resin, and the amount of the urethane/amino acid copolymer contained in the resin layer is 0.9 to 9.0% by weight of total solid resin.

Furthermore, according to the present invention, there is provided a process for the production of a moisture-permeable waterproof fabric, which comprises adding a solution of a polyurethane having a 100% modulus of at least 40 $kg/cm^2$ to a product solution obtained by reacting a urethane prepolymer having isocyanate terminals with an N-carboxy-amino acid anhydride and an amine in such an amount that the amount of the reaction product contained in the resulting resin layer is 12.9 to 85.3% by weight of total solid resin, further adding an isocyanate crosslinking agent to the mixture to form an organic solvent solution, coating the organic solvent solution on at least one surface of a fabric, carrying out a coagulation, removal of the solvent and drying, and subjecting the fabric to a water repellent treatment.

Moreover, according to the present invention, there is provided a process for the production of a moisture-permeable waterproof fabric, which comprises adding a solution of a polyurethane having a 100% modulus of at least 40 $kg/cm^2$ to a product solution obtained by reacting a urethane prepolymer having isocyanate terminals with an N-carboxy-amino acid anhydride and an amine in such an amount that the amount of the reaction product contained in the resulting resin layer is 12.9 to 85.3% by weight of total solid resin, further adding an isocyanate crosslinking agent to the mixture to form an organic solvent solution, coating the organic solvent solution on at least one surface of a fabric, carrying out a coagulation, removal of the solvent and drying, coating an organic solvent solution of a polyurethane on the surface of the formed mixed resin layer, carrying out a coagulation, removal of the solvent and drying, and subjecting the fabric to a water repellent treatment.

DESCRIPTION OF THE PREFERRED EMBODIMENTS

Synthetic fibers such as polyester fibers, polyamide fibers, acrylic fibers and rayon fibers, natural fibers such as cotton fibers and wool fibers, and mixtures of these fibers, are preferably used as the material of the starting fabric of the present invention.

The material of the resin layer used in the present invention is a mixture comprising a product obtained by reacting a urethane prepolymer having isocyanate terminals with an N-carboxyamino acid anhydride and an amine, and a polyurethane having a 100% modulus of at least 40 $kg/cm^2$, and the amount of the resin product is from 12.9 to 85.3%, preferably 20.0 to 72.4% by weight of total solid resin. For a clothing fabric, to obtain a good touch and feel, preferably this amount is from 58.5 to 72.4% by weight.

If this amount is lower than 12.9% by weight, cells of the resin layer formed by wet coagulation become too large and few fine cells are formed, and therefore, the moisture permeability intended in the present invention cannot be obtained. If this amount is higher than 85.3% by weight, many fine cells are formed in the resin layer obtained by wet coagulation, and therefore, the water pressure resistance, peel strength and washing fastness become poor.

As the method of obtaining a reaction product by reacting a urethane prepolymer having isocyanate terminals with an N-carboxyamino acid anhydride and an amine, there can be mentioned, for example, a method in which an N-carboxyamino acid anhydride (hereinafter referred to as "NCA") is mixed with a urethane prepolymer having isocyanate terminals, an amine is then added to the mixture and a reaction is carried out, and a method in which a urethane prepolymer having isocyanate terminals is reacted with an amine and the reaction product is further reacted with NCA. In view of the solubilities of the starting materials and product, preferably dimethylformamide is used as the reaction solvent.

N-carboxyamino acid anhydrides of α-amino acids such as glutamic acid, aspartic acid, lysine, alginine and methionine, and alkyl esters thereof are preferably used as the NCA.

The urethane prepolymer having isocyanate terminals is obtained by a reaction of an excessive amount of a diisocyanate compound with a diol compound. Tolylene diisocyanate, diphenylmethane diisocyanate and isophorone diisocyanate can be used as the diisocyanate compound, and polyether glycols such as polyethylene glycol and polypropylene glycol and polyester glycols such as polycaprolactone glycol can be used as the diol compound.

As the amine, there can be used primary amines such as hydrazine, ethylenediamine and propanediamine, secondary amines such as dialkylamines, tertiary amines such as trialkylamines, and alcohol amines.

Since the reaction is a competitive reaction comprising three kinds of polymerization reactions, the obtained reaction product is a mixture of three polymers, i.e., a urethane/amino acid copolymer, a polyurethane and a polyamino acid. The mixing ratio of these polymers can be controlled, for example, by changing the charge ratio of the starting NCA, isocyanate terminal-containing urethane prepolymer and amine.

In the present invention, to maintain the resin solution in a stable condition, preferably the proportion of the urethane/amino acid copolymer occupying the reaction product is not larger than 20% by weight of total solid, more preferably not larger than 15% by weight.

A polyurethane having a 100% modulus of at least 40 kg/cm$^2$ is selected as the polyurethane to be used in the present invention. If the 100% modulus is lower than 40 kg/cm$^2$, the water pressure resistance and peel strength are too low.

An isocyanate crosslinking agent may be further be incorporated in the mixed resin solution of the urethane/amino acid copolymer and the polyurethane in the present invention.

If the isocyanate crosslinking agent is not incorporated, the peel strength may be low. The content of the crosslinking agent is preferably 0.5 to 10% by weight.

In the present invention, an isocyanate crosslinking agent having terminals not blocked is used as the isocyanate crosslinking agent. To prevent a decomposition by water, an isocyanate crosslinking agent having terminals blocked with phenol or methylethylketone oxime is generally used, and after the formation of a resin layer, the blocking is released by a heat treatment to effect a crosslinking reaction. In the process for producing a moisture-permeable waterproof fabric by using a polyamino acid/urethane resin (Japanese Unexamined Patent Publication No. 61-63777), it is taught that the isocyanate group may be free or blocked. Practically, however, although a product having a high peel strength is obtained with a free isocyanate group, a high-temperature heat treatment at a temperature higher than 150° C. is necessary when a crosslinking agent blocked with phenol is used or a high-temperature heat treatment at a temperature higher than 170° C. is required when a crosslinking agent blocked with methylethylketone oxime is used. Accordingly, a fine-cell structure formed by wet coagulation is destroyed or the bonding becomes uneven, because of an uneven dissociation of the blocks. According to the present invention, these problems are solved by using an isocyanate crosslinking agent having terminals not blocked. In the present invention, even if such an isocyanate type crosslinking agent is used, the problem of decomposition by water does not arise. This is considered to be because, since the isocyanate type crosslinking agent is oleophilic, the majority of the crosslinking agent is not decomposed even though a part of the crosslinking agent coming into contact with water is decomposed.

As the isocyanate crosslinking agent, there can be mentioned diisocyanate such as 2,4-tolylene diisocyanate, diphenylmethane diisocyanate, isophorone diisocyanate and hexamethylene diisocyanate, and triisocyanates formed by reacting these diisocyanates with active hydrogen-containing compounds.

To increase the moisture permeability and improve the strength of the resin layer, desirably the amount of the urethane/amino acid copolymer contained in the mixed resin layer is adjusted to 0.9 to 9.0% by weight, preferably 1.3 to 8.6% by weight.

In the present invention, additives such as pigments and the like may be used. In this case, the amount of the additives are not considered in calculation of the amount of the reaction product contained in the resin layer.

In the present invention, the moisture permeability is the value as measured under conditions of a temperature of 40° C. and relative humidity of 90% according to the cup method of JIS Z-0208. To reduce the stuffy feeling in a high-humidity environment, preferably the moisture permeability is higher than 8,000 g/m$^2$·24 hours.

In the present invention, the water pressure resistance is the value measured according to the high-pressure method of JIS L-1092. To prevent an intrusion of rain water into the cloth on a rainy day, preferably the water pressure resistance is higher than 2,000 mmH$_2$O. Preferably, the retention ratio of the water pressure resistance after washing is at least 80%.

To maintain a comfortable moisture environment within the cloth, preferably the rate of increase of the moisture permeability by the temperature is at least 200 g/m$^2$·24 hours·degree, most preferably at least 300 g/m$^2$·24 hours·degree.

The rate of increase of the moisture permeability by the temperature, as referred to herein, is the value obtained by dividing the difference between the moisture permeability $P_{40}$ (g/m²·24 hours) at a temperature of 40° C. and a relative humidity of 90% and the moisture permeability $P_{25}$ (g/m²·24 hours) at a temperature of 25° C. and a relative humidity of 90% by the temperature difference (15° C.). Note, the value determined by JIS Z-0208 is used as the moisture permeability.

As the value of the rate of increase of the moisture permeability by the temperature is larger, an excellent moisture permeability is exerted under high-temperature and high-humidity conditions and a relatively low moisture permeability is obtained at a low temperature. Accordingly, the humidity environment within the cloth can be positively controlled.

The process for the production of the moisture-permeable processed fabric of the present invention will now be described.

Before the formation of a resin layer by a wet coagulation, to prevent an excessive intrusion of a resin solution into a fabric, a water repellent treatment and a calender treatment are preferably first carried out.

An organic solvent solution comprising a product obtained by reacting a urethane prepolymer having isocyanate terminals with an N-carboxyamino acid anhydride and an amine and a solution of a polyurethane having a 100% modulus of at least 40 kg/cm², the amount of the reaction product contained in the resin layer being 12.9 to 85.3% by weight, and further comprising an isocyanate crosslinking agent is coated on at least one surface of a fabric, and a coagulation, removal of the solvent and drying are carried out. To maintain a high strength and a good touch and feel in the resin layer, the amount coated of the mixed resin after drying is preferably adjusted to 15 to 45 g/m².

To further improve the strength of the processed fabric, preferably a polyurethane layer is further formed on the thus-obtained layer, by a wet coagulation.

In view of the solubility of the mixed resin and the ease of coagulation and removal of the solvent, an organic solvent composed mainly of a polar organic solvent such as dimethylformamide (hereinafter referred to as "DMF"), dimethylacetamide or N-methylpyrrolidone is preferably used as the solvent for the mixed resin.

The coagulation and removal of the solvent can be accomplished by a known wet coagulation method. An aqueous solution of the solvent for the mixed resin or water is preferably used as the coagulation bath. To appropriately adjust the size of fine cells formed in the resin layer, the coagulation temperature is preferably controlled to 10° to 50° C. Water is preferably used for removal of the solvent, and the removal of the solvent is preferably carried out at a temperature of 10° to 80° C.

The solvent-removed fabric is then dried according to customary procedures, at a drying temperature of preferably 90° to 140° C.

The isocyanate crosslinking agent forms a crosslinking structure in the resin layer by a heat treatment conducted after the formation of the resin layer, and this crosslinking structure contributes to an improvement of the strength and durability.

After removal of the solvent and drying, a water repellent treatment is carried out for imparting a durable water repellency to the fabric. A known water repellent agent can be used for the water repellent treatment. To increase the grade of a fabric product, a finish setting treatment is preferably carried out.

The present invention will now be described in detail with reference to the following examples.

The moisture permeability, water pressure resistance, and peel strength were measured according to methods of JIS Z-0208, JIS L-1092, and JIS Z-1089, respectively.

Washing was carried out according to JIS K-3371. Namely, a 0.2% aqueous solution of Synthetic Detergent 251 (weakly alkaline; first class) maintained at 40±2° C. was charged in a household electric washing machine, and a test sample and an additional cloth in a total amount of about 500 g were washed for 25 minutes and rinsed for 10 minutes. These steps were repeated twice and the sample was naturally dried. These operations were regarded as one cycle of the washing.

EXAMPLE 1

A polyester twill fabric (each of the warp and weft was a 100-denier/50 filament yarn; the warp density was 171 yarns per inch and the weft density was 84 yarns per inch) was padded with a 10% aqueous solution of a fluorine type water repellent agent (Asahi Guard AG710), dried and cured, and a filling-up was carried out by a plastocalender.

At 110° C., 246 parts by weight of polytermethylene ether glycol was reacted with 555 parts by weight of isophorone diisocyanate for 5 hours to obtain a urethane prepolymer having isocyanate groups at terminals (the isocyanate equivalent was 1230).

In 500 g of dimethylformamide were dissolved 120 g of the urethane prepolymer and 12 g of NCA of γ-methyl-L-glutamate, 15 g of a 2% aqueous solution of hydrazine was added to the solution with stirring, and a reaction was carried out at 30° C. for 2 hours to obtain an emulsion-like product solution having a viscosity of 4,000 cps at 30° C.

The flowability of this product solution was good, the solid concentration in the product solution was 20%, and the proportion of the urethane/amino acid copolymer in the solid was 10%.

A DMF solution of a mixed resin, which was prepared by mixing 80 parts by weight of the above-mentioned product solution, 20 parts by weight of a 30% DMF solution of a polyurethane resin having a 100% modulus of 60 kg/cm² (8166 supplied by Dainippon Ink), 20 parts by weight of DMF, 2 parts by weight of an isocyanate type crosslinking agent (Resamine NE supplied by Dainichi Seika) and 5 parts of a white pigment (L-1500 supplied by Dainippon Ink), was coated on the above-mentioned woven fabric at a slit width of 0.2 mm, and coagulation was conducted in a 15% aqueous solution of DMF for 5 minutes. Then, the solvent was removed by water at 25° C., and washing and drying were carried out. The fabric was heated with a fluorine type oily water repellent and subjected to finish setting at 150° C. to obtain a coated fabric. The amount coated of the mixed resin was 27.5 g/m² after drying, the amount of the reaction product contained in the resin layer was 66.7% by weight, and the amount of the urethane/amino acid copolymer contained in the mixed resin layer was 6.7% by weight.

With respect to the obtained fabric, the moisture permeability, water pressure resistance, peel strength and rate of increase of the moisture permeability by the temperature were measured, and the results are shown in Table 1.

COMPARATIVE EXAMPLE 1

A coated fabric was prepared in the same manner as described in Example 1 except that a 30% DMF solution of a polyurethane resin having a 100% modulus of 30 kg/cm$^2$ (8006 supplied by Dainippon Ink) was used as the polyurethane and water was used as the coagulating bath. The amount coated of the mixed resin after drying was 28.0 g/m$^2$, the amount of the reaction product contained in the resin layer was 66.7% by weight, and the amount of the urethane/amino acid copolymer contained in the mixed resin layer was 6.7% by weight.

With respect to this fabric, the moisture permeability, water pressure resistance, peel strength and rate of increase of the moisture permeability by the temperature were measured, and the results are shown in Table 1.

COMPARATIVE EXAMPLE 2

A coated fabric was prepared in the same manner as described in Example 1 except that a resin solution formed by mixing 100 parts by weight of the urethane/amino acid copolymer-containing reaction product solution prepared in Example 1, 20 parts by weight of DMF, 2 parts by weight of an isocyanate type crosslinking agent (Resamine NE supplied by Dainichi Seika) and 5 parts by weight of a white pigment (L-1500 supplied by Dainippon Ink) was used and water was used as the coagulating bath.

The amount coated of the resin after drying was 29.0 g/m$^2$, the amount of the reaction product contained in the resin layer was 90.9% by weight, and the amount of the urethane/amino acid copolymer contained in the mixed resin layer was 9.1% by weight.

With respect to this fabric, the moisture permeability, water pressure resistance, peel strength and rate of increase of the moisture permeability by the temperature were measured, and the results are shown in Table 1.

COMPARATIVE EXAMPLE 3

A coated fabric was prepared in the same manner as described in Example 1 except that 18 parts by weight of the urethane/amino acid copolymer-containing reaction product solution and 82 parts by weight of the polyurethane resin solution (8166) were used.

The amount coated of the resin was 25.5 g/m$^2$ after drying, the amount of the reaction product contained in the resin layer was 11.9% by weight, and the amount of the urethane/amino acid copolymer contained in the mixed resin layer was 1.2% by weight.

With respect to this fabric, the moisture permeability, water pressure resistance, peel strength and rate of increase of the moisture permeability by the temperature were measured, and the results are shown in Table 1.

COMPARATIVE EXAMPLE 4

A coated fabric was prepared in the same manner as described in Example 1 except that the urethane/amino acid copolymer-containing reaction product solution was not used and 100 parts by weight of the solution of the polyurethane resin having a 100% modulus of 60 kg/cm$^2$ (8166 supplied by Dainippon Ink) was used.

The amount coated of the resin was 28.5 g/m$^2$ after drying.

With respect to this fabric, the moisture permeability, water pressure resistance, peel strength and rate of increase of the moisture permeability by the temperature were measured, and the results are shown in Table 1.

COMPARATIVE EXAMPLE 5

A coated fabric was prepared in the same manner as described in Comparative Example 1 except that the isocyanate type crosslinking agent was not used.

The amount coated of the resin was 28.0 g/m$^2$ after drying.

With respect to this fabric, the moisture permeability, water pressure resistance, peel strength and rate of increase of the moisture permeability by the temperature were measured, and the results are shown in Table 1.

EXAMPLE 2

A coated fabric was prepared in the same manner as described in Example 1 except that the amounts of the urethane/amino acid copolymer-containing reaction product solution and the solution of the polyurethane having a 100% modulus of 60 kg/cm$^2$ (8166 supplied by Dainippon Ink) were changed to 70 parts by weight and 30 parts by weight, respectively.

The amount coated of the mixed resin was 29.0 g/m$^2$ after drying, the amount of the reaction product contained in the resin layer was 56.0% by weight, and the urethane/amino acid copolymer contained in the mixed resin layer was 5.6% by weight.

With respect to this fabric, the moisture permeability, water pressure resistance, peel strength and rate of increase of the moisture permeability were measured, and the results are shown in Table 2.

EXAMPLE 3

A nylon twill fabric (each of the warp and weft was a 75-denier/36 filament yarn; the warp density was 133 yarns per inch; the weft density was 90 yarns per inch) was padded with a 10% aqueous solution of a fluorine type water repellent (Asahi Guard AG710), dried and cured, and the filling-up was carried out by using a plasto-calender.

Then, a coated fabric was prepared in the same manner as described in Example 1 except that a 30% DMF solution of a polyurethane resin having a 100% modulus of 90 kg/cm$^2$ (8616 supplied by Dainippon Ink) was used as the polyurethane and water was used as the coagulating bath.

The amount coated of the mixed resin was 28.5 g/m$^2$ after drying, the amount of the reaction product contained in the resin layer was 66.7% by weight, and the amount of the urethane/amino acid copolymer was 6.7% by weight.

With respect to the obtained fabric, the moisture permeability, water pressure resistance, peel strength and rate of increase of the moisture permeability by the temperature were measured, and the results are shown in Table 2.

EXAMPLE 4

A coated fabric was prepared in the same manner as described in Example 2 except that the amounts of the urethane/amino acid copolymer-containing reaction product solution and the solution of the polyurethane resin having a 100% modulus of 60 kg/cm$^2$ (8166 supplied by Dainippon Ink) were changed to 85 parts by weight and 15 parts by weight, respectively.

The amount coated of the mixted resin was 26.0 g/m$^2$ after drying, the amount of the reaction product contained in the resin layer was 66.7% by weight, and the amount of the urethane/amino acid copolymer contained in the mixed resin layer was 7.2% by weight.

With respect to this fabric, the moisture permeability, water pressure resistance, peel strength and rate of increase of the moisture permeability by the temperature were measured, and the results are shown in Table 2.

EXAMPLE 5

A coated fabric was prepared in the same manner as described in Example 2 except that the amounts of the urethane/amino acid copolymer-containing reaction product solution and the solution of the polyurethane resin having a 100% modulus of 60 kg/cm² (8166 supplied by Dainippon Ink) were changed to 30 parts by weight and 70 parts by weight, respectively.

The amount coated of the mixed resin was 25.3 g/m² after drying, the amount of the reaction product contained in the resin layer was 20.7% by weight, and the amount of the urethane/amino acid copolymer contained in the mixed resin layer was 2.1% by weight.

With respect to this fabric, the moisture permeability, water pressure resistance, peel strength and rate of increase of the moisture permeability by the temperature were measured, and the results are shown in Table 2.

EXAMPLE 6

A coated fabric was prepared in the same manner as described in Example 2 except that the amounts of the urethane/amino acid copolymer-containing reaction product solution and the solution of the polyurethane resin having a 100% modulus of 60 kg/cm² (8166 supplied by Dainippon Ink) were changed to 50 parts by weight and 50 parts by weight, respectively.

The amount coated of the mixed resin was 30.3 g/m² after drying, the amount of the reaction product contained in the resin layer was 37.0% by weight, and the amount of the urethane/amino acid copolymer contained in the mixed resin layer was 3.7% by weight.

With respect to this fabric, the moisture permeability, water pressure resistance, peel strength and rate of increase of the moisture permeability by the temperature were measured, and the results are shown in Table 2.

COMPARATIVE EXAMPLE 6

A coated fabric was prepared in the same manner as described in Example 2 except that the amounts of the urethane/amino acid copolymer-containing reaction product solution and the solution of the polyurethane resin having a 100% modulus of 60 kg/cm² (8166 supplied by Dainippon Ink) were changed to 92 parts by weight and 8 parts by weight, respectively.

The amount coated of the mixed resin was 26.5 g/m² after drying, the amount of the reaction product contained in the resin layer was 80.7% by weight, and the amount of the urethane/amino acid copolymer contained in the mixed resin layer was 8.1% by weight.

With respect to this fabric, the moisture permeability, water pressure resistance, peel strength and rat of increase of the moisture permeability by the temperature were measured, and the results are shown in Table 2.

TABLE 1

| | 100% Modulus[4] of PU | Amount of Product in Resin Layer % by weight | Amount[5] of PAU in Resin Layer | Moisture Permeability[1] 25° C.[2] | Moisture Permeability[1] 40° C.[2] | Water Pressure Resistance (mm H₂O) before washing | Water Pressure Resistance (mm H₂O) before washing | Peel Strength (g/cm) warp | Peel Strength (g/cm) weft | Rate[3] of Increase of Moisture Permeability by Temperature | Cross-linking Agent |
|---|---|---|---|---|---|---|---|---|---|---|---|
| Example 1 | 60 | 66.7 | 6.7 | 4250 | 11460 | 4400 | 4000 | 940 | 610 | 480 | added |
| Comparative Example 1 | 30 | 66.7 | 6.7 | 4650 | 10920 | 3000 | 1000 | 400 | 280 | 418 | added |
| Comparative Example 2 | — | 90.9 | 9.1 | 7200 | 11500 | 3200 | 920 | 510 | 410 | 287 | added |
| Comparative Example 3 | 60 | 11.9 | 1.2 | 2930 | 5460 | 5400 | 4100 | 1100 | 830 | 169 | added |
| Comparative Example 4 | 60 | 0 | 0 | 2310 | 5010 | 5000 | 1700 | 1300 | 950 | 186 | added |
| Comparative Example 5 | 60 | 66.7 | 6.7 | — | 11800 | 2800 | —[6] | 130 | 140 | — | not added |

Note
[1] unit = g/m² · 24 hours
[2] relative humidity = 90%
[3] unit = g/m² · 24 hours · degree
[4] unit = kg/cm²
[5] unit = % by weight
[6] measurement impossible because of peeling of film

TABLE 2

| | 100% Modulus[4] of PU | Amount of Product in Resin Layer % by weight | Amount[5] of PAU in Resin Layer | Moisture Permeability[1] 25° C.[2] | Moisture Permeability[1] 40° C.[2] | Water Pressure Resistance (mm H₂O) before washing | Water Pressure Resistance (mm H₂O) after washing | Peel Strength (g/cm) warp | Peel Strength (g/cm) weft | Rate[3] of Increase of Moisture Permeability by Temperature | Cross-linking Agent |
|---|---|---|---|---|---|---|---|---|---|---|---|
| Example 2 | 60 | 56.0 | 5.6 | 3460 | 9500 | 4200 | 3800 | 910 | 690 | 402 | added |
| Example 3 | 90 | 66.7 | 6.7 | 3510 | 10320 | 3030 | 2500 | 400 | 1510 | 454 | added |
| Example 4 | 60 | 72.3 | 7.2 | 3120 | 10730 | 3900 | 3500 | 810 | 630 | 507 | added |
| Example 5 | 60 | 20.7 | 2.1 | 3080 | 8800 | 5500 | 4100 | 960 | 720 | 381 | added |
| Example 6 | 60 | 37.0 | 3.7 | 3050 | 9100 | 4800 | 3900 | 930 | 680 | 403 | added |
| Comparative | 60 | 80.7 | 8.1 | 6140 | 11050 | 2700 | 850 | 520 | 380 | 327 | added |

TABLE 2-continued

|  | 100% Modulus[*4] of PU | Amount of Product in Resin Layer % by weight | Amount[*5] of PAU in Resin Layer | Moisture Permeability[*1] | | Water Pressure Resistance (mm H₂O) | | Peel Strength (g/cm) | | Rate[*3] of Increase of Moisture Permeability by Temperature | Cross-linking Agent |
| --- | --- | --- | --- | --- | --- | --- | --- | --- | --- | --- | --- |
|  |  |  |  | 25° C.[*2] | 40° C.[*2] | before washing | after washing | warp | weft |  |  |
| Example 6 |  |  |  |  |  |  |  |  |  |  |  |

Note
[*1]unit = g/m² · 24 hours
[*2]relative humidity = 90%
[*3]unit = g/m² · 24 hours · degree
[*4]unit = kg/cm²
[*5]unit = % by weight According to the present invention, there is provided a coated fabric which does not give a stuffy feeling or does not cling even upon movement or during work, which is comfortable even in the rain as no leakage of water occurs, and in which the initial performances are not lowered even after washing is repeatedly conducted.

Therefore, the present invention can provide a material applicable to fields where conventional waterproof moisture-permeable fabrics cannot be used because of an insufficient performance, for example, for the production of heavy duty sports wear such as mountain-climbing wear, wind breakers, ski wear, and working raincoats.

We claim:

1. A moisture-permeable waterproof fabric having a resin layer formed on at least one surface thereof, wherein the resin layer is composed of a mixture comprising a copolymer product obtained by reacting a urethane prepolymer having isocyanate terminals with an N-carboxyamino acid annhydride and an amine, and a polyurethane having a 100% modulus of at least 40 kg/cm², wherein the amount of the resin product contained in the resin layer is 12.9 to 85.3% by weight of total solid resin, and the amount of the urethane/amino acid copolymer contained in the resin layer is 0.9 to 9.0% by weight of total solid resin, wherein the moisture permeability of said resin layer is at least 8,000 gm²·24 hours and the water pressure resistance of said resin layer is at least 2,000 mm H₂O and wherein the retention ratio of the water pressure resistance after washing is at least 80%.

2. A moisture-permeable waterproof fabric as set forth in claim 1, wherein the rate of increase of the moisture permeability by the temperature is at least 200 g/m²·24 hours·degree.

3. A moisture-permeable waterproof fabric as set forth in claim 1, wherein the amount of the resin product is 20.0 to 72.4% by weight.

4. A moisture-permeable waterproof fabric as set forth in claim 1, wherein the amount of the resin product is 58.5 to 72.4% by weight.

5. A moisture-permeable waterproof fabric as set forth in claim 1, wherein the amount of the urethane/amino acid copolymer is 1.4 to 8.6% by weight.

6. A moisture-permeable waterproof fabric as set forth in claim 1, wherein the proportion of the urethane/amino acid copolymer occupying the reaction mixture is not larger than 20% by weight of total solid.

7. A moisture-permeable waterproof fabric as set forth in claim 1, wherein the mixed resin layer is cross-linked with an isocyanate crosslinking agent.

8. A process for the production of a moisture-permeable waterproof fabric, which comprises adding a solution of a polyurethane having a 100% modulus of at least 40 kg/cm² to a product solution obtained by reacting a urethane prepolymer having isocyanate terminals with an N-carboxy amino acid anhydride and an amine in such a proportion that the amount of the reaction product contained in the resulting resin layer is 12.9 to 85.3% by weight of total solid resin, further adding an isocyanate crosslinking agent to the mixture to form an organic solvent solution, coating the organic solvent solution on at least one surface of a fabric, coagulating the solution, removing the solvent from the coagulated solution, drying the fabric, and subjecting the fabric to a water repellent treatment.

9. A process for the production of a moisture-permeable waterproof fabric according to claim 10, further comprising coating a second organic solvent solution of a polyurethane of the surface of the formed mixed resin layer, coagulating the second solution, removing solvent from the solution and drying the fabric, prior to subjection the fabric to the water repellant treatment.

10. A process for the production of a moisture-permeable waterproof fabric according to claim 8, wherein the amount coated of the mixed resin after drying is adjusted to 15 to 45 g/m².

11. A process for the production of a moisture-permeable waterproof fabric according to claim 8, wherein coagulation is carried out at a temperature of 10° to 50° C.

12. A process for the production of a moisture-permeable waterproof fabric according to claim 8, wherein removal of solvent is carried out at a temperature of 10° to 80° C.

13. A process for the production of a moisture-permeable waterproof fabric according to claim 8, wherein drying is carried out at a temperature of 90° to 140° C.

* * * * *

UNITED STATES PATENT AND TRADEMARK OFFICE
CERTIFICATE OF CORRECTION

PATENT NO. : 5,326,632
DATED : July 5, 1994
INVENTOR(S) : Tatsuya Zenda et al

It is certified that error appears in the above-indentified patent and that said Letters Patent is hereby corrected as shown below:

In column 11, line 42, delete "$gm^2 \cdot 24$" and substitute --$g/m^2 \cdot 24$--.

In column 12, line 39, delete "of", first occurrence, and substitute --on--.

Signed and Sealed this

Sixth Day of September, 1994

Attest:

BRUCE LEHMAN

*Attesting Officer*   *Commissioner of Patents and Trademarks*